United States Patent
Jeansonne et al.

(10) Patent No.: US 9,928,367 B2
(45) Date of Patent: Mar. 27, 2018

(54) RUNTIME VERIFICATION

(71) Applicant: Hewlett-Packard Development Company, L.P., Houston, TX (US)

(72) Inventors: Jeffrey K. Jeansonne, Houston, TX (US); Valiuddin Y. Ali, Cypress, TX (US); Stanley Hyojun Park, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 133 days.

(21) Appl. No.: 14/957,898

(22) Filed: Dec. 3, 2015

(65) Prior Publication Data
US 2017/0161497 A1    Jun. 8, 2017

(51) Int. Cl.
*G06F 21/00*     (2013.01)
*G06F 21/56*     (2013.01)
*G06F 12/14*     (2006.01)
*G06F 13/42*     (2006.01)
*G06F 21/57*     (2013.01)

(52) U.S. Cl.
CPC ........ *G06F 21/566* (2013.01); *G06F 12/1458* (2013.01); *G06F 13/4282* (2013.01); *G06F 21/57* (2013.01); *G06F 2212/1052* (2013.01)

(58) Field of Classification Search
USPC ................................... 726/23; 713/179, 320
See application file for complete search history.

(56) References Cited

U.S. PATENT DOCUMENTS

| | | |
|---|---|---|
| 7,103,641 B2 | 9/2006 | Brannock |
| 8,122,244 B2 | 2/2012 | Azema et al. |
| 9,013,207 B2 | 4/2015 | Krimon et al. |
| 2003/0084346 A1* | 5/2003 | Kozuch ............... G06F 21/57 726/4 |
| 2011/0004778 A1* | 1/2011 | Tsukamoto ........... G06F 1/3278 713/324 |
| 2014/0068275 A1 | 3/2014 | Swanson et al. |
| 2014/0089710 A1* | 3/2014 | Yeh ................... H04W 52/0296 713/323 |
| 2015/0331754 A1 | 11/2015 | Grobelny |
| 2016/0055113 A1* | 2/2016 | Hodge ................. G06F 21/575 710/308 |
| 2017/0300692 A1* | 10/2017 | Robison ................ G06F 21/566 |

OTHER PUBLICATIONS

Tse, Tom, "PCB Layout Guide for MEC140x/MEC141x", Microchip Technology, Inc., Jul. 8, 2015, 25 pages.
Freescale, P1020 QorIQ Integrated Processor Reference Manual, Rev. 5, Jun. 22, 2011, www.element14.com/community/servlet/JiveServlet/previewBody/39744-102-1-225062/freescale.Reference_Manual_1.pdf, 80 pages.

* cited by examiner

*Primary Examiner* — Jason Lee
(74) *Attorney, Agent, or Firm* — Brooks, Cameron & Huebsch

(57) ABSTRACT

Example implementations relate to runtime verification. In one example, runtime verification includes a processor, a shared memory storing embedded controller instructions, and an embedded controller to verify the embedded controller instructions stored in the shared memory during runtime of the processor.

17 Claims, 3 Drawing Sheets

RUNTIME VERIFICATION

BACKGROUND

A computing system can include code to perform various startup functions of the computing system. This code can include Basic Input/Output System (BIOS) code. BIOS code can be the subject of attacks by malware in the computing system or from an external service. As a result of an attack, the BIOS code can become compromised.

DETAILED DESCRIPTION

Malware attacks on system instructions used to perform startup of a computing system can cause the integrity of the computing system to be compromised such that unauthorized access and operations in the computing system can occur. Compromised system instructions can refer to system instructions that have been corrupted such that the system instructions are not executable and/or have been changed in some way but are still executable. For example, compromised system instructions can allow undesired remote monitoring and/or control of the computing system by a malicious entity, unauthorized access and/or modification of data in the computing system by malware, disablement of the computing system, and so forth. Consequently, it may be desirable to verify integrity of system instructions. Some approaches attempting to verify system instructions have been limited to attempting verification prior to runtime of the computing system and/or during sleep states of the computing system.

Accordingly, examples of the disclosure include methods, systems, and computer-readable and executable instructions suitable for runtime verification. For example, runtime verification can include a processor, a shared memory storing embedded controller (EC) instructions, and an EC to verify the EC instructions stored in the shared memory during runtime of the processor. Runtime refers to a state during which a processor executes code and a platform controller hub (PCH) coupled to the processor is in an Advanced Configuration and Power Interface (ACPI) S0 state. Desirably, verification during runtime operation of the computing system can provide comparatively earlier identification of compromised EC instructions as compared to previous approaches that occurred prior to runtime and/or during low power states.

Figure 1:
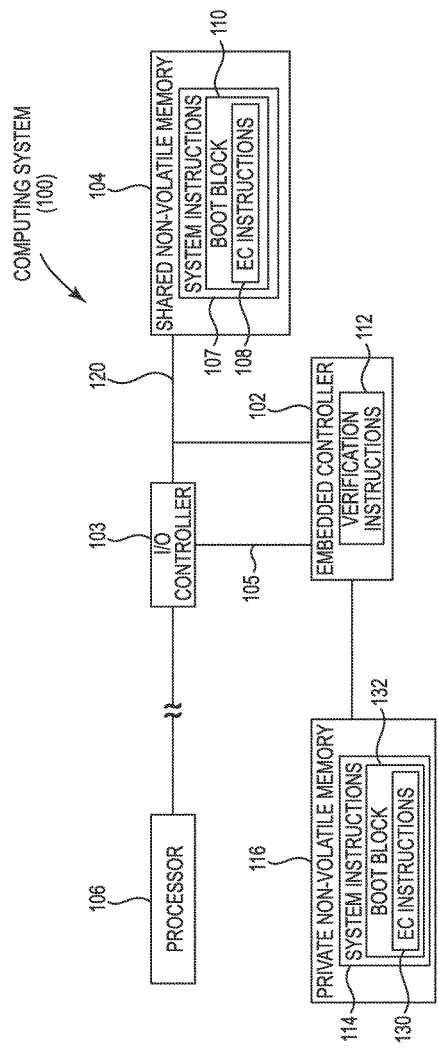
FIG. 1 illustrates a block diagram of an example of a computing system suitable for runtime verification according to the disclosure.

FIG. 1 illustrates a block diagram of an example of a computing system 100 suitable for runtime verification. The computing system 100 includes an EC 102, an input/output (I/O) controller 103, a shared non-volatile memory 104, a processor 106, and a private non-volatile memory 116.

The EC 102 can be physically separate from the processor 106 of the computing system 100 as illustrated or can be physically coupled to the processor in some examples. The processor 106 can execute the operating system (OS), application instructions, and other instructions in the system 100. The EC 102 can be used to perform specific predefined tasks, as programmed into EC instructions 108. Examples of tasks that can be performed by the EC 102 can include controlling a power supply that supplies power supply voltages to various components in the computing system 100, charging and control of a battery in the computing system 100, monitoring a temperature in the computing system 100, controlling a fan in the computing system 100, and/or interaction with a user input device (such as a keyboard, mouse, etc. of the computing system 100), among others. The EC 102 can be implemented with a microcontroller, an application-specific integrated circuit (ASIC), a programmable gate array (PGA), or any other type of programmable circuit.

The I/O controller 103 is physically separate from the processor 106 and the EC 103 of the computing system. As illustrated in FIG. 1, the I/O controller 103 can be provided between the processor 106 and the shared non-volatile memory 104 while also being between the EC 102 and the shared non-volatile memory 104. For instance, the I/O controller 103 can be connected between the processor 106 and a shared bus 120 while being connected between the EC 102 and the shared bus 120.

In some examples, the I/O controller 103 can be a Platform Controller Hub (PCH), among other types of I/O controllers suitable to promote runtime verification, as described herein. The PCH can include various functions, including a display interface to a graphics subsystem, a system bus interface to a system bus to which various I/O devices can be connected, and so forth.

The I/O controller 103 can, in various examples, facilitate runtime communication between the processor 106 and the shared non-volatile memory 104. Similarly, the I/O controller 103 can permit runtime communication between the EC 102 and the shared non-volatile memory 104. Notably, such runtime communication from the EC 102 to the shared non-volatile memory 104 can promote runtime verification, as described herein.

The shared non-volatile memory 104 is "shared" in the sense that it is accessible by multiple entities, including the EC 102 and at least one other entity (including the processor 106). The private non-volatile memory 116 is accessible by the EC 102, but is inaccessible to the processor 106 or to other components in the computing system 100. Making the private non-volatile memory 116 inaccessible to the processor 106 and other components protects the content of the private non-volatile memory 116 from unauthorized tampering. The private non-volatile memory 116 is accessible by the EC 102 at all times.

The private non-volatile memory 116 can be physically separate from the shared non-volatile memory 104 (such as implemented in different physical memory devices). Alternatively, the private non-volatile memory 116 and the shared non-volatile memory 104 can physically reside on a common memory device, but the shared non-volatile memory 104 and the private non-volatile memory 116 are in different segments of the physical memory device, where the segment of the physical memory device that contains the private non-volatile memory 116 is accessible by the EC 102 and is not accessible by the processor 106.

The shared non-volatile memory 104 is accessible over a shared bus 120 by the EC 102 or by another entity. In various examples, the shared bus 120 can be a shared Serial Peripheral Interface (SPI) bus. A SPI bus is a synchronous serial data link in which devices on the SPI bus operate in a master-slave mode. That is, just one master can have access to the shared bus 120 at any given time, such that just one master can access the shared non-volatile memory 104 at a time. In some examples, runtime access requests from the EC 102 and runtime access requests from the processor 106 are transmitted by the I/O controller 103 via the shared bus 120 to the shared memory 104 (i.e., shared non-volatile memory).

Runtime communications associated with the EC 102 can be provided via an enhanced serial peripheral interface (eSPI) bus 105 to the I/O controller 103 during runtime of the processor. For instance, in some examples, runtime access requests from the EC 102 are provided via the eSPI bus 105 to the I/O controller 103 during runtime of the processor 106.

For instance, the I/O controller 103 can operate to prevent collisions between bus traffic and/or network traffic associated with (e.g., to and/or from) the EC 102 and bus traffic and/or network traffic associated with the processor 106 by permitting either of the EC 102 or the processor 106 to communicate during runtime with the shared non-volatile memory 104 at a given moment. In this manner, both the EC 102 and the processor 106 can access the shared non-volatile memory at different times during runtime. Put another way, in contrast to other approaches, the EC 102 can access the shared non-volatile memory 104 during runtime without having exclusive runtime access to the shared non-volatile memory 104.

The shared non-volatile memory 104 can store system instructions 107. System instructions 107 can be used to perform startup of a computing system. System instructions 107 can be in the form of machine-readable instructions executable on a processor (or processors) of the computing system. Examples of computing systems include desktop computers, notebook computers, tablet computers, personal digital assistants (PDAs), smartphones, game appliances, server computers, storage nodes, network communication nodes, among other examples.

System instructions can include Basic Input/Output System (BIOS) instructions, which can initialize various components of the computing system, and load an operating system (OS) of the computing system. The BIOS instructions can perform checking of hardware components to ensure that the hardware components are present and functioning properly. This can be part of a power-on self-test (POST) procedure and/or a booting sequence. The BIOS instructions can load and pass control to the OS. BIOS instructions can include legacy BIOS instructions or Unified Extensible Instructions Interface (UEFI) instructions.

The BIOS instructions can include EC instructions 108 that are executable by the EC 102, and a boot block 110 that is to be executed by the processor 106. The EC instructions 108 can be machine-readable instructions executable in the EC 102. Alternatively, the EC instructions 108 can be application software that can be in the form of machine-readable instructions. In the ensuing discussion, although reference is made to "EC instructions," it is noted that techniques or mechanisms can be applied to other forms of the EC instructions 108.

The EC instructions 108 and/or boot instructions (not shown) can be included in the boot block 110 of the system instructions 107. Including the EC instructions 108 inside the boot block 110 can provide an indication that the EC instructions 108 have been signed by the entity that provided the system instructions 107, which can be the vendor of the computing system 100, or another entity. In other examples, the EC instructions 108 can be separate from the boot block 110.

The boot block 110 is a part of the BIOS instructions, and is executed when the computing system 100 starts up prior to the rest of the BIOS instructions are executed. The boot block 110 can be used to check the integrity of the BIOS instructions as well as to perform other initial functions. If the boot block 110 confirms the integrity of the BIOS instructions, the boot block 110 can pass control to the main portion of the BIOS instructions for initiating the remaining operations associated with the BIOS instructions.

The computing system 100 also includes the private non-volatile memory 116, which stores a system instructions copy 114. The system instructions copy 114 can include a boot block 132 and/or EC instructions 130. The system instructions copy 114 in the private non-volatile memory 116 can be a duplicate of the system instructions 107 in the shared non-volatile memory 104. Alternatively, the system instructions copy 114 can be a different version (later version or earlier version) than the system instructions 107.

The EC 102 can attempt to use the EC instructions 130 in the private non-volatile memory 116 during a restart of the computing system 100. If the EC 102 is unable to successfully use the EC instructions 130, then the EC 102 can use the EC instructions 108 in the shared non-volatile memory 104 in an attempt to start the computing system 100. If the EC 102 is unable to start the system using either of the EC instructions 130 or the EC instructions 108, then an error has occurred, which is likely due to compromise of both the EC instructions 130 and the EC instructions 108.

The EC 102 includes verification instructions 112 to verify the EC instructions (130 and/or 108) retrieved from a non-volatile memory (116 and/or 104) during an initialization procedure of the EC 102 and/or notably, during runtime, as described herein, among other possibilities. An initialization procedure (i.e., "initialization") refers to a procedure that is performed when the EC 102 starts after the EC 102 has been reset or after a power cycle of the EC 102 (where power is removed from and then re-applied to the EC 102).

Verifying a piece of instructions, such as the EC instructions, system instructions and/or data, can refer to cryptographically validating that the piece of instructions has not been changed and/or confirming that the piece of instructions are from a trusted source, as described herein. In some examples, the EC 102 includes verification instructions 112 that can verify the piece of instructions (e.g., EC instructions (130 and/or 108)) periodically at a fixed interval of time such as every 15 minutes, among other possible fixed intervals. However, the disclosure is not so limited. Rather, runtime verification can occur in response to a request such as those from a system administrator and/or a request from the computing system 100 and/or another computing system coupled to the computing system 100, and/or can occur in response to meeting a condition such as upon a download to the computing system 100, among other possibilities.

In addition to possible verification during runtime the EC 102 can verify the EC instructions prior to each restarted execution of the system instructions by the processor 106, such as due to a cold reset of the computing system 100, a resume from a low power state of the computing system 100 such as the ACPI S3, S4, or S5 states, an operating system restart, and so forth. The EC instructions can also be verified by the EC instructions each time the computing system 100 enters a low power state and/or when the processor 106 remains powered, for instance, during runtime, as described herein, and/or in response to a warm reset of the computing system 100, in which a computing system 100 is restarted without removing power to the computing system 100.

Runtime verification by the EC 102 can include the EC 102 retrieving EC instructions 108 of the shared non-volatile memory 104. The verification instructions 112 can then perform verification of the EC instructions 108. Such verification of the EC instructions can be based on use of a cryptographic-based verification technique. For example, the verification can be a Rivest, Shamar, and Adleman (RSA) verification technique that employs cryptographic encryption. The RSA verification technique involves use of a public key and a private key. The public key is known to multiple entities, but the private key is known to a single entity and no other entities. Data encrypted with a private key can be decrypted using the corresponding public key. Alternatively, data can be encrypted using the private key, but decrypted using the public key.

When the verification instructions 112 determine during runtime that the EC instructions 108 from the shared non-volatile memory 104 are verified, then the EC instructions 108 is executed in and/or continues to be executed in the EC 102 to perform various EC tasks. However, if the verification instructions 112 are determined to be compromised the EC 102 can cause the EC instructions 108 to be repaired and/or provide a notification, among other possibilities. Causing refers to directly causing the repair and/or executing instructions with an expectation of repair occurring as a result of executing the instructions. For example, the EC 102 can cause the EC instructions 108 to be repaired during runtime and/or during another state such as a low power state.

Repair can include using boot block 132 to fix boot block 110. For instance, instructions and/or data from the boot block 132 and/or the EC instructions 130 can be copied in a manner to replace instructions and/or data in boot block 110 and/or EC instructions 108, among other possibilities. Repair can occur during runtime; however the disclosure is not so limited. Rather as mentioned repair can occur during runtime and/or during low power states, among other possibilities. Notification can include indicating an error a variety of ways such as adding the error to an event log and/or otherwise providing notification of EC instructions 108 have not been successfully verified and/or otherwise compromised.

Figure 2:
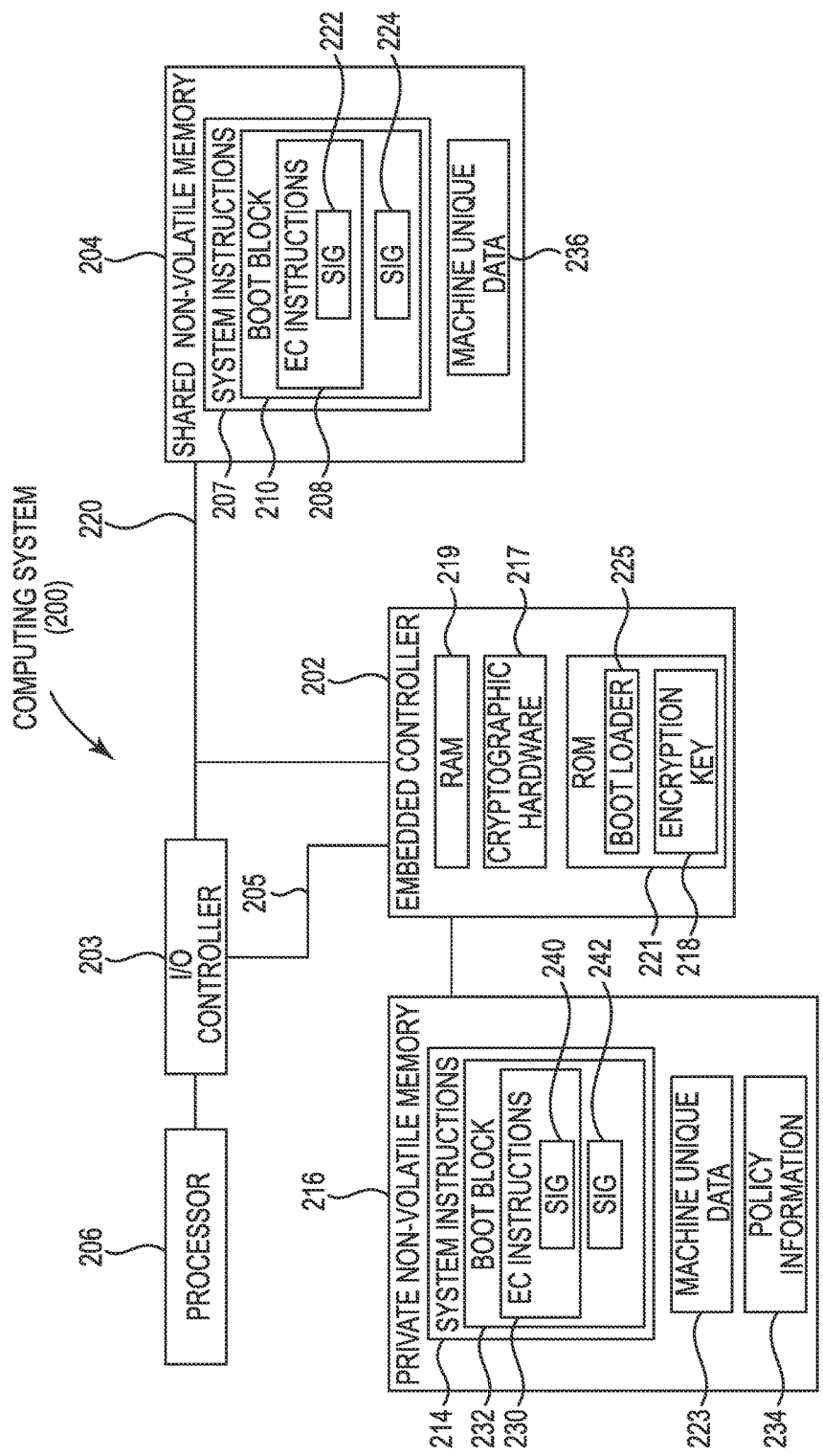
FIG. 2 illustrates a block diagram of another example of a computing system suitable for runtime verification according to the disclosure.

FIG. 2 illustrates a block diagram of a further example of a computing system of FIG. 1. As illustrated in FIG. 2, the computing system 200 includes an I/O controller 203, which is connected between the processor 206 and the shared bus 220. The EC 202 can be coupled to a user input device such as a mouse device or other type of input device, a keyboard, a fan, a battery and/or a power supply to manage the respective devices (under control of the EC instructions for example).

The EC 202 can include cryptographic hardware 217, which can perform cryptographic computations, such as those used in the verifying of the EC instructions and/or the boot block. The cryptographic hardware 217 can be in the form of circuitry that is to perform cryptographic computations.

The EC 202 can include a read-only memory (ROM) 221, which can be used to store a boot loader 225 and/or an encryption key 218. The encryption key 218 can be the key (public key or private key) used to perform verification of the EC instructions (230 or 208). During system startup, the boot loader 225 is loaded from the ROM 221 to execute in the EC 202 to retrieve EC instructions from the private or shared non-volatile memory 216 or 204 into a random access memory (RAM) 219 of the EC 202.

To retrieve EC instructions for loading into the EC 202, the boot loader 225 can find a pointer (or other reference) to an EC instructions image, which can be stored in the private or shared non-volatile memory 216 or 204. The retrieved EC instructions are verified by the verification instructions, as described herein, which can include functionality in the boot loader 225 to invoke the cryptographic hardware 217 to assist in performing cryptographic computations.

In the shared non-volatile memory 204, a signature 222 is associated with the EC instructions 208, and a signature 224 is associated with the boot block 210. Similarly, in the private non-volatile memory 216, a signature 240 is associated with the EC instructions 230, and a signature 242 is associated with the boot block 232.

The signature 240 or 222 is used in the verification of the respective EC instructions 208 or 230, while the signature 242 or 224 is used in the verification of the respective boot block 210 or 232. Use of a signature in the verification process can allow a determination of the authenticity of the respective EC instructions or boot block, and a determination that the respective EC instructions or boot block has not been compromised. Determining EC instructions as compromised can include cryptographically detecting that a piece (e.g., a key, etc.) of the EC instructions has been changed and/or confirming that the piece of EC instructions is from a trusted source, among other possibilities.

Verification of the EC instructions 208 or 230 can be accomplished by decrypting the respective signature 222 or 240 using the encryption key 218 stored in the ROM 221, among other suitable cryptographic technique can be used to perform the verification. Decrypting the signature produces a respective value (e.g., a hash value) that can be compared with a corresponding calculated value (e.g., a hash value) of the EC instructions. If the foregoing values match, then the EC instructions are verified. A similar process can be used for verifying the BIOS boot block 210 or 232 using the respective digital signature 224 or 242.

The private non-volatile memory 216 can also store machine unique data 223 and policy information 234. For example, the policy information 234 can include information relating to one or some combination of the following policies: 1) a policy specifying whether an aggressive mode of operation is to be used, where aggressive mode enables verification of system instructions in every case where the host processor will execute the boot block (on each cold boot, warm boot, resume from low power state, etc.); 2) a policy specifying whether a manual or automated recovery mode is to be used, where a manual recovery mode involves a user action before recovery of a compromised boot block is allowed to be performed; and 3) a policy specifying whether a locked or unlocked mode is to be used, where locked mode causes system instructions to be locked to a specific version, such as the version in the private non-volatile memory 216.

Machine unique data can refer to data and/or settings that are unique to each particular computing system. Examples of machine unique data can include any or some combination of the following: product name, product model, stock-keeping unit (SKU) number (for identifying the respective computing system for sale), a serial number of the computing system, a system or commodity tracking number (for identifying a system board of the computing system), a system configuration identifier (for identifying a configuration of the computing system), warranty data (for describing a warranty associated with the computing system), a universally unique identifier (UUID), and/or a default setting of BIOS code, among other types of machine unique date can be provided. The shared non-volatile memory 204 also stores machine unique data 236 that is the same as or similar to the machine unique data 223.

The verification instructions 112 can be stored on a non-transitory memory resource such as RAM 219 and/or ROM 221 as non-transitory MRM including machine readable instructions (MRI), among other possibilities. Memory resource can be integrated in a single device or distributed across multiple devices. Further, memory resource can be fully or partially integrated in the same device as the EC 202, and/or the processing resource 206 or it can be separate but accessible to the EC 202 and/or the processor 206.

The memory resource can include a number of modules (not shown) such as a transmit module and verify module. The number of modules can include MRI (e.g., verification instructions) that when executed by the EC 202 can perform a number of functions including those described herein.

The transmit module can include instructions that when executed by the EC 202 transmit, via a eSPI 205 and the I/O controller 203, communications between (e.g., to and/or from) the EC 202 and the shared memory non-volatile memory 204 during runtime of a processor, where the shared non-volatile memory 204 is accessible by the EC 202 and the processor 206 during runtime.

The verify module can include instructions that when executed by the EC 202 verify the EC instructions 208 stored in the shared non-volatile memory 204, as described herein. In some examples, the verify module can include instructions to send a notification following verification (e.g., identifying the EC instructions as verified or compromised, etc.). In some examples, the verify module can provide a notification to have the CPU shut down and/or a notification to enter a low power state when the EC instructions 208 are compromised. For example, a notification (e.g., an electronic communication, etc.) can be provided to a system administrator and/or added to an event log, among other possibilities.

That is, in some examples, the verify module can include instructions to add a result of the verification to an event log. For example upon conducting verification of the EC instructions 208 stored in the shared non-volatile memory 204 the result of such verification (verified or compromised) can be included in an event log. The result be indicated by indication of the instructions as verified or compromised, among other possibilities. Such addition of the result of verification by the verify module can promote notification of a system administrator and/or a computing system of the result of the verification.

Figure 3:
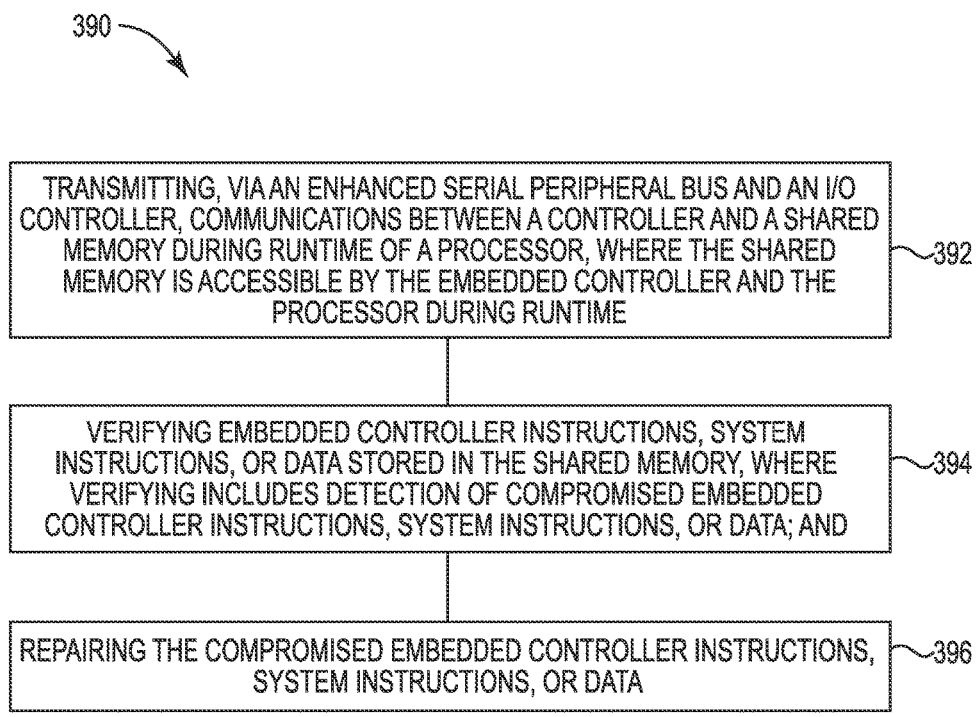
FIG. 3 illustrates a flow diagram of an example of a method suitable for runtime verification according to the disclosure.

FIG. 3 illustrates a flow diagram of an example of a method suitable for runtime verification according to the disclosure. As shown at 392, the method 390 can include transmitting, via an eSPI bus and an I/O controller, communications between a controller and a shared memory during runtime of a processor, where the shared memory is accessible by the EC and the processor during runtime. That is, runtime verification, as described herein, leverages capabilities of an eSPI bus and/or those of an I/O controller to perform runtime verification of EC instructions, system instructions, and/or other data (e.g., machine unique data) stored in memory such as shared memory. As mentioned, transmitting can include sending and or receiving communications such as runtime access request (e.g., those suitable to promote verification of EC instructions stored in the shared memory) sent from the EC to the shared memory.

The method 390 can include, verifying EC instructions, system instructions, and/or data stored in the shared memory, where verifying includes detection of compromised EC instructions, system instructions, and/or data stored in the shared memory, as shown at 394. As mentioned, verifying can include cryptographically validating that a piece (e.g., a key, etc.) of the EC instructions, system instructions, and/or data has not been changed and/or confirming the piece of EC instructions, system instructions, and/or data are from a trusted source, among other possibilities. In some examples, verifying includes verifying the EC instructions, and/or other data (e.g., boot instructions stored in shared memory) are part of BIOS instructions stored in the shared memory. As shown at 396, the method 390 can include repairing the compromised EC instructions, the system instructions or data stored in the shared memory, as described herein. For example, repairing can comprise repairing the compromised EC instructions, system instructions, and/or data stored in the shared memory during runtime, among other possibilities.

In some examples, the method can include recording result of verification in a private non-volatile memory, such as those described herein. Recording the result (e.g., verified and/or compromised) in the private non-volatile memory that is accessible by the embedded controller, not the processor, can promote notification of the result. For instance, other notifications (e.g., a notification included in an event log) may be subject to some attacks that may the result stored in the private non-volatile memory may not be subject to.

The figures herein follow a numbering convention in which the first digit or digits correspond to the drawing figure number and the remaining digits identify an element or component in the drawing. Similar elements or components between different figures may be identified by the use of similar digits. For example, 100 may reference element "100" in FIG. 1, and a similar element may be referenced as "200" in FIG. 2.

Many examples can be made without departing from the spirit and scope of the system and method of the disclosure, this specification sets forth some of the many possible example arrangement and implementations. Elements shown in the various examples herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

As used herein, "a number of" an element and/or feature can refer to one or more of such elements and/or features. In addition, "for example" and similar phrasing is intended to mean, "by way of example and not by way of limitation". It is understood that when an element is referred to as being "on," "connected to", "coupled to", or "coupled with" another element, it can be directly on, connected, or coupled with the other element or intervening elements may be present.

What is claimed:

1. A system, comprising:
a hardware processor;
a shared memory storing embedded controller instructions; and
an I/O controller located between the shared memory and the hardware processor and wherein the I/O controller is located between the shared memory and an embedded controller, the embedded controller to:
verify integrity of the embedded controller instructions stored in the shared memory during runtime of the hardware processor, wherein the embedded controller instructions are executable in the embedded controller, and wherein the shared memory is accessible, via the I/O controller, by the embedded controller and the processor during runtime of the hardware processor, wherein verifying the integrity of the embedded controller instructions stored in the shared memory during runtime of the hardware processor that provides comparatively earlier identification of compromised embedded controller instructions as compared to approaches that occur prior to the runtime of the hardware processor, approaches that occur during low power states of the hardware processor, or a combination of both; and cause repair of the compromised embedded controller instructions.

2. The system of claim 1, I/O controller is to facilitate the shared memory to receive runtime access requests from the embedded controller and runtime access requests from the hardware processor.

3. The system of claim 2, wherein the runtime access requests from the embedded controller are provided via an enhanced serial peripheral interface bus to the I/O controller during runtime of the hardware processor.

4. The system of claim 2, wherein the runtime access requests from the embedded controller and the runtime access requests from the hardware processor are transmitted by the I/O controller via a shared bus to the shared memory.

5. The system of claim 2, wherein runtime comprises execution of the I/O controller in an advanced configuration and power (ACPI) S0 state.

6. The system of claim 1, wherein the embedded controller causes the embedded controller instructions to be repaired during runtime.

7. The system of claim 1, wherein the embedded controller verifies the embedded controller instructions stored in the shared memory periodically during runtime of the hardware processor.

8. The system of claim 1, wherein the embedded controller is further to verify the embedded controller instructions are from a trusted source.

9. A non-transitory machine-readable medium including instructions executable to:

transmit, via an enhanced serial peripheral bus and an I/O controller, communications between an embedded controller and a shared memory during runtime, wherein the shared memory is accessible by the embedded controller and hardware processor during runtime, wherein the I/O controller is located between the shared memory and an embedded controller;

verify, during runtime of the hardware processor, integrity of embedded controller instructions, system instructions, or data stored in the shared memory, wherein the instructions to verify the embedded controller instructions, the system instructions, or the data stored in the shared memory provide comparatively earlier identification of compromised embedded controller instructions, system instructions, or data as compared to approaches that occur prior to the runtime of the hardware processor, approaches that occur during low power states of the hardware processor, or a combination of both; and repair the compromised embedded controller instructions, system instructions, or data.

10. The medium of claim 9, further comprising instructions to add a result of the verification to an event log.

11. The medium of claim 9, further comprising instructions to send a notification to have the CPU enter a low power state when the embedded controller instructions, system instructions, or data are compromised.

12. A method, comprising:

transmitting, via an enhanced serial peripheral bus and an I/O controller, communications between a controller and a shared memory during runtime of a hardware processor, wherein the shared memory is accessible by the embedded controller and the hardware processor during runtime, wherein the I/O controller is located between the shared memory and an embedded controller;

verifying, during runtime of a hardware processor, integrity of embedded controller instructions, system instructions, or data stored in the shared memory, wherein the verifying includes detection of compromised embedded controller instructions, system instructions, or data, wherein the verifying of the embedded controller instructions, the system instructions, or the data provides comparatively earlier identification of compromised embedded controller instructions, system instructions, or data as compared to approaches that occur prior to the runtime of the hardware processor, approaches that occur during low power states of the hardware processor, or a combination of both; and repairing the compromised embedded controller instructions, system instructions, or data.

13. The method of claim 12, wherein repairing comprises repairing the compromised embedded controller instructions, system instructions, or data during runtime of the hardware processor.

14. The method of claim 13, wherein verifying the embedded controller instructions in the shared memory comprises verifying the embedded controller instructions are part of basic input/output system (BIOS) instructions stored in the shared memory.

15. The method of claim 13, comprising recording result of verification in a private non-volatile memory.

16. The medium of claim 9, further comprising instructions to cryptographically validate that the embedded controller instructions, system instructions, or data are from a trusted source.

17. The method of claim 12, wherein verifying further comprises cryptographically validating that the embedded controller instructions, system instructions, or data are from a trusted source.

* * * * *